July 21, 1936.  G. C. KENNEDY  2,048,553
ADJUSTABLY EXTENSIBLE CARRIER
Filed Dec. 11, 1931  3 Sheets-Sheet 1

Inventor,
G. C. Kennedy.

July 21, 1936.  G. C. KENNEDY  2,048,553
ADJUSTABLY EXTENSIBLE CARRIER
Filed Dec. 11, 1931   3 Sheets-Sheet 2

Inventor
G. C. Kennedy

July 21, 1936.  G. C. KENNEDY  2,048,553
ADJUSTABLY EXTENSIBLE CARRIER
Filed Dec. 11, 1931  3 Sheets-Sheet 3

Inventor
G. C. Kennedy.

Patented July 21, 1936

2,048,553

UNITED STATES PATENT OFFICE 2,048,553

ADJUSTABLY EXTENSIBLE CARRIER

George Colvin Kennedy, Waterloo, Iowa

Application December 11, 1931, Serial No. 580,331

16 Claims. (Cl. 224—29)

My invention relates to improvements in automobile adjustable extension trunks, and the object of my improvement is first, to provide for an extension trunk of the class mentioned, a carrier extension device constructed for both adjustable longitudinal horizontal extensions and for adjustable tilting relative thereto; and second, to supply on said extension device adjustable removable partitioning elements, and which may also be extended therefrom or collapsed thereagainst.

Other improvements include side walls, fixed or hinged, for either or all the sections of said extension device, to retain a load of various shapes or dimensions as desired.

I have accomplished the above objects by the means which are hereinafter described and claimed, and which are illustrated in the accompanying drawings, in which similar numerals denote similar parts throughout the several views.

Figure 7:
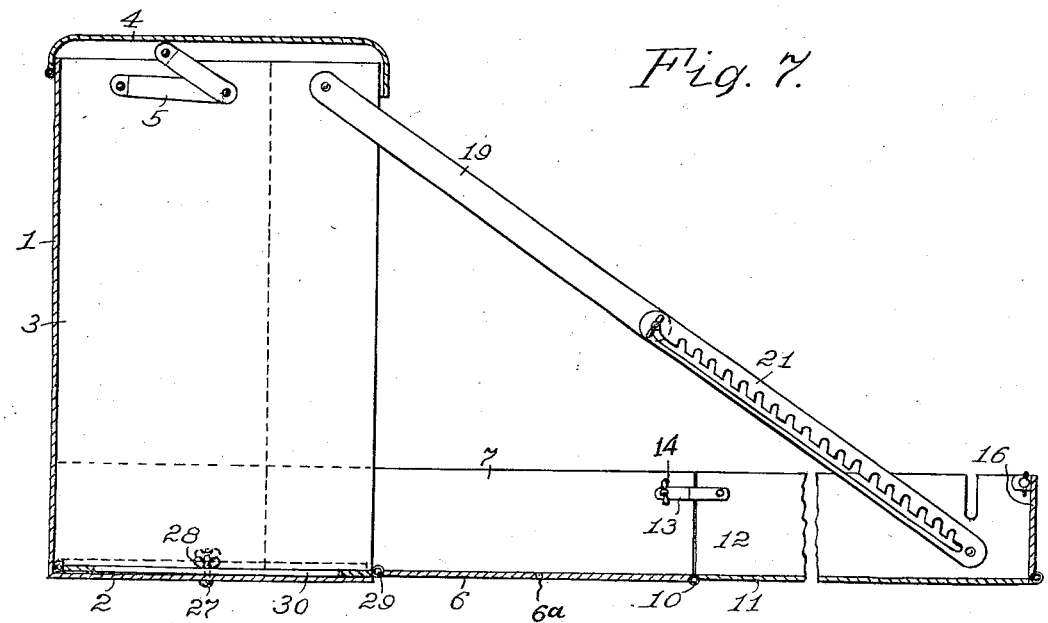
Figure 8:
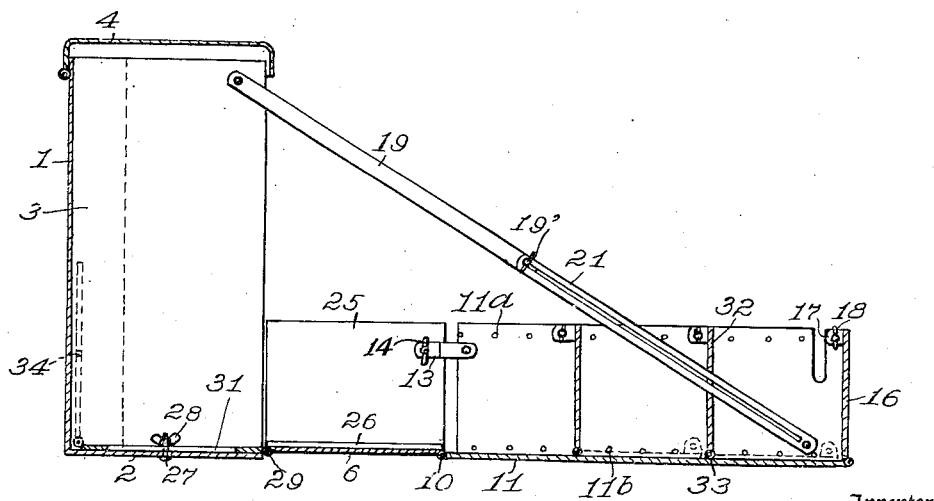

In said drawings, Figs. 1, 4, 7 and 8 are various modifications of my invention taken in like vertical longitudinal section, with the adjustable carrier device extended, the dotted lines in Figs. 7 and 8 showing the positions of the parts of said carrier collapsed. Figs. 2 and 5 respectively show the specific carrier devices of Figs. 1 and 4 collapsed. Fig. 3 is a vertical transverse section taken on the line 3—3 of Fig. 3 of the trunk and carrier device shown in Figs. 1 and 2. Fig. 6 is a horizontal section of the trunk with a top plan of the carrier device as extended, of said Figs. 4 and 5, with a portion of the carrier device removed.

In all of the said representations is shown a hollow trunk body made up of a front wall 1, a bottom 2, side walls 3, and a hinged top closure 4, the latter opening swingingly at the rear. A hinged drop device 5 may be connected foldingly on each side between a side wall 3 and the adjacent depending side flange of said swinging cover or closure 4. All said parts, except the cover 4, are rigidly connected, and usually but not necessarily imperforate.

Figure 1:
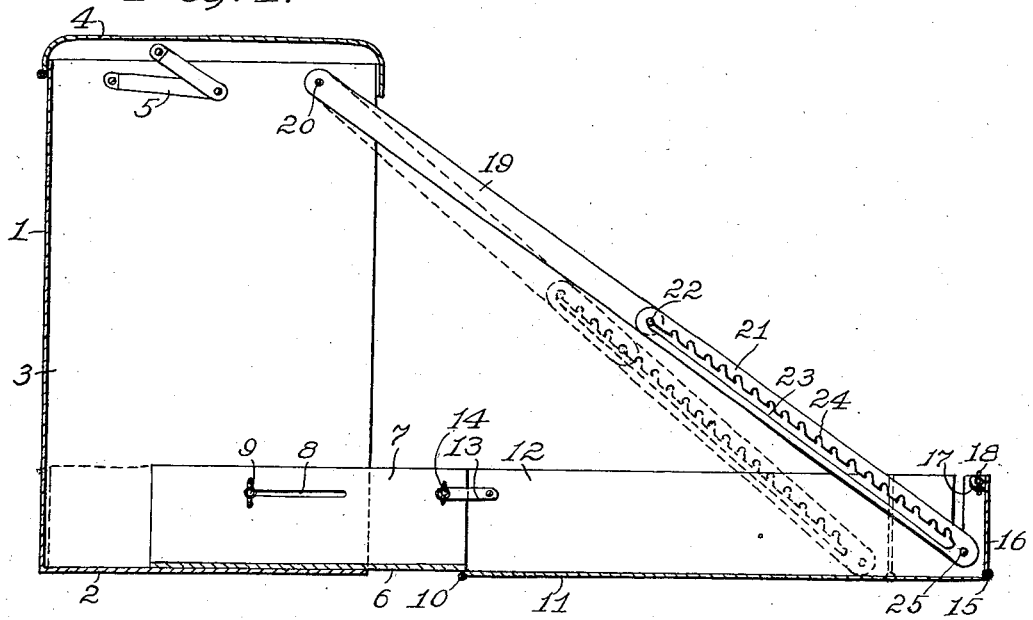
Figures 2, 3:
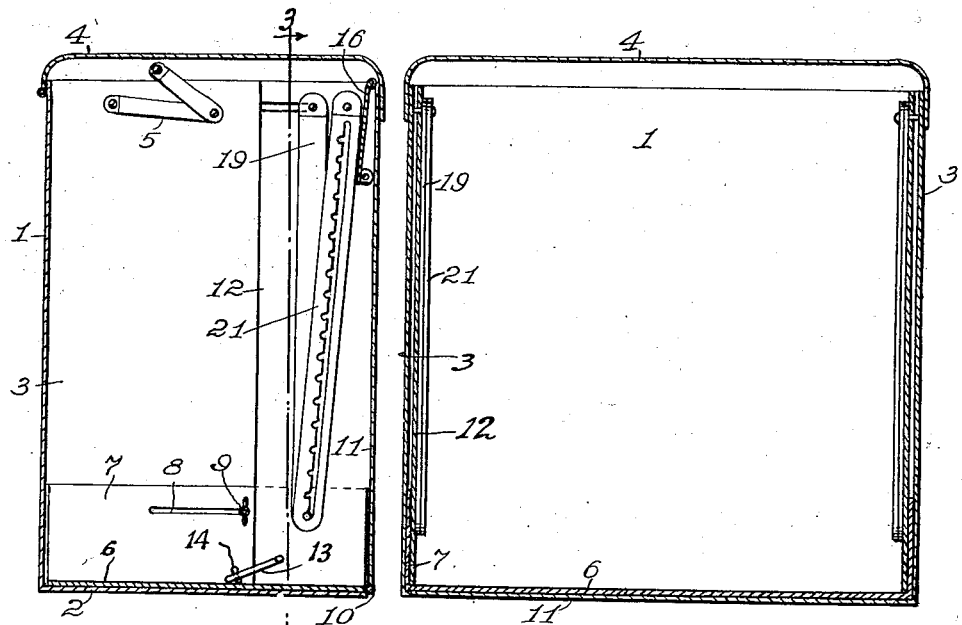

Referring to Figs. 1 to 3, the numerals 6 and 11 denote extension carrier sections hinged together at 10, and having side flanges or walls 7 and 12 respectively. These carrier sections are of a suitable width to be loosely slidable in the forward section 6 into the said trunk body along the bottom wall 2, the rear section 11 being a little wider so that its side walls 12 may fold inside of the side walls 7 when collapsed as shown in Fig. 2. Each side wall 7 has a longitudinal slot 8 to receive therethrough a threaded bolt 9, headed, when passed through a hole in the side wall 3 of the trunk, or 9 may be a threaded stud fixed on the inner face of each of the side walls 3 to traverse said slot, and having a clamping wingnut on its inner end to secure the walls 7 in a longitudinally adjusted position within the trunk or as projecting therefrom. When the rear section 11 is swung to a horizontal position, a pair of swinging catches 13 on its side walls 12 may be apertured to receive a headed bolt 14 passed through a hole in the adjacent side wall 7 and secured removably by a wing-nut. The rear end of the section 11 has an end-gate 16 hinged at 15 thereto, and the end-gate has apertured ears 17 to receive headed bolts passed through registered holes in the side walls 12 and secured by wing-nuts 18, so that the end-gate may swing outwardly, or inwardly between the side walls 12. It will be seen that when the sections 6 and 11 are horizontally extended, they may both be pulled to the rear adjustably to a limit measured by the length of the slot 8 at the extreme, but when the forward section 6 is within the trunk body, it hinge 10 is along the rear transverse edge of the bottom wall 2, so that the section 11 when swung upwardly, serves as a rear closure for the trunk body after the cover 4 has first been lifted and then lowered to inclose its upper edge. This provides a closed trunk body, as all of these wall parts are imperforate usually. Adjustable hangers, each of sections 19 and 21, have on each side of the trunk and within it and the carrier part 11—12, a joint pivot or pintle 22 traversing a hole in the section 19 and slidable in a longitudinal slot 23 in the other section, the outer ends of the sections being pivoted at 20 and 25 respectively to the side walls 3 and 12, the slots 23 having notches 24 to receive the pintle 22 adjustably.

It will be seen that the above arrangement of the hanger parts 19 and 21 permits the carrier parts 11 and 6 to be supported suspensively notwithstanding any of the adjustments longitudinally of these carrier parts, and that the notches 24 may receive the pintle 22 at any notch to support the section 11 at any tilted angular relation to the section 6 between the vertical and horizontal positions thereof as set by the notches, but in case light loads, relatively, are to be carried, the notches may, as shown in Fig. 8, be omitted, and the parts 19 and 21 set angularly tiltably at any angular position, by tightening the wing-nut 19' on the pintle 22. The tilting position of the section 11 is also possible whatever the longitudinal adjustment of the section 6, so that loads of various shapes may be carried. In Figs. 2 and 3 the collapsed positions of the sections 7 and 11, also of the hangers 19 and 21, and the end-gate 16 are shown, and these elements very little interfere with the contents of the trunk when closed or being packed, or in having the load removed.

Figure 4:
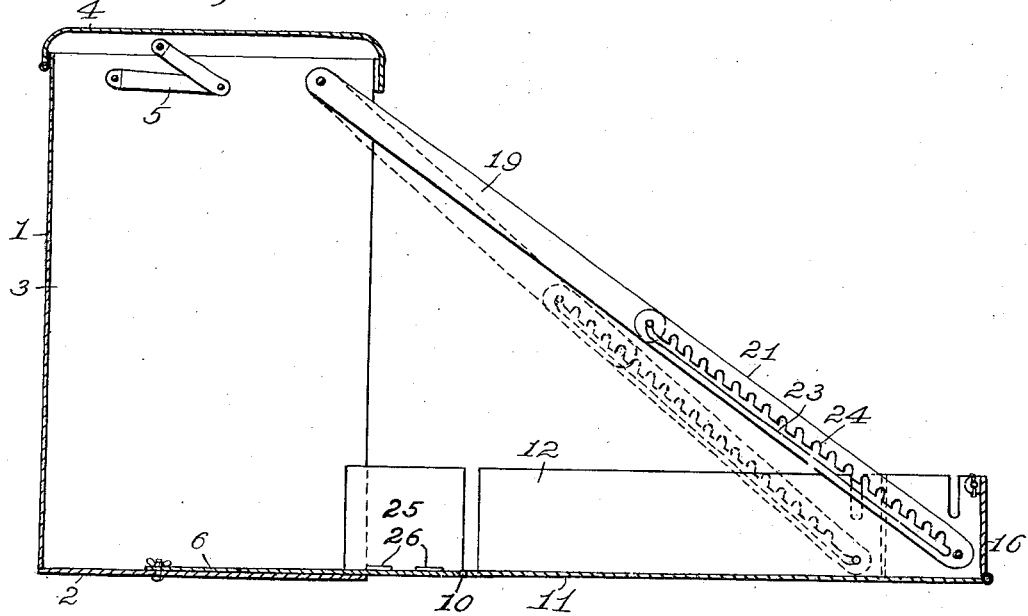
Figures 5, 6:
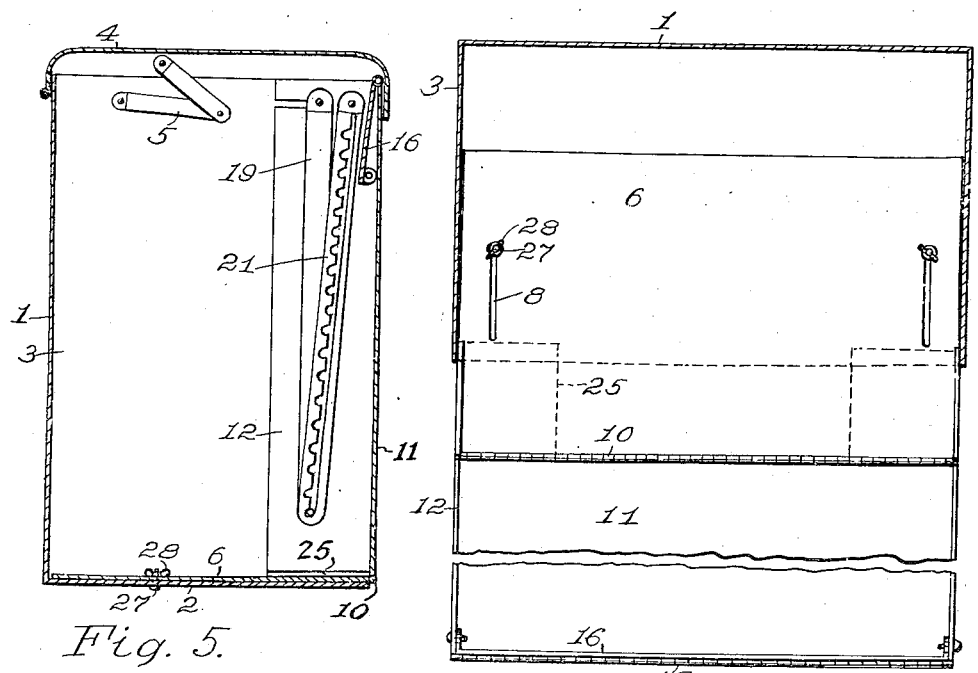

Referring to Figs. 4 to 6 inclusive, the elements are the same as above described, except that the forward carrier section 6 has no fixed side walls, but is supplied along its rear portion only with short side walls 25 hinged thereto at 26 and which may be folded inwardly, in case some part of a leading projects laterally, and the projection may then be seated to traverse the side opening in the extended carrier thus provided. In these views, however, as shown in Fig. 6, the slots 8 are placed in the part 6, receiving the bolts 27 passed through holes in the trunk bottom 2 and secured by wing-nuts 28.

The modification shown in Fig. 8 also relates to the modified construction of the sectional carrier. In this, the forward section 6 has infolding side walls 25 hinged thereto at 26, the section 11 having rigid side walls. The section 6 is short, and has a transverse hinge connection 29 with a forward section 31, and the latter has slots and fastenings through holes 34 like those shown in Fig. 6. When the section 6 is within the trunk, the section 31 is against the front wall 1 out of the way of the contents. This is accomplished in the following manner. The nuts 28 are removed from their bolts and these bolts are then removed and the forward section 31 turned upward on the hinge 29 to vertical position. The rear extension 6 is then slid in to the body to rest on the bottom 2 so that the member 31 rests, as shown in dotted lines, against the wall 1. The bars 13 are now released and the sides 25 turned down on the member 6. The remaining section 11 is now turned up on the hinge 10 to close the rear of the trunk. Obviously, the hinged support is manipulated by folding or sliding its sections to permit this operation.

The section 11 of Fig. 8 has in the side walls at the tops a row of holes 11a and near the bottom rows of holes 11b. Transverse partitioning plates 32 may be seated upon the section 11 and have removable pintle and wing-nut pivots at 33 traversing the lower holes 11b, while the plates have apertured ears 17 through which and holes 11a bolts and nuts may be applied to secure the plates extended in the same manner as end-gate 16 is secured at 17 and 18 in Fig. 8. When the bolts are removed from said ears, the plates 32 may be swung down upon the section 11 as indicated by the dotted lines. The partitions 32 may be placed at will in the carrier to provide compartments of the same or different widths, or entirely removed.

In the modification of Fig. 7, the rear section 11 is hinged at 10 to the now intermediate section 6, and the latter is similarly hinged at 29 to a forward section 30 of the same length longitudinally. This permits the carrier when projected to be of a greater length as the section 6 is now entirely without the trunk, the section 30 being secured adjustably in the trunk as before described, by slot and bolt connections, and also that part 30 may be projected a distance farther outwardly, to further increase the length of the carrier. With this arrangement the movable parts may be arranged to close the rear side of the trunk in the following manner. The nuts 28 are removed and the member 30 folded over to lie on top of the member 6 which is provided with openings 6a. The two members are moved into the trunk and positioned so that the bolts 27 project up through the openings 6a and the slots in the member 30. The nuts 28 are then reapplied to the bolts 27 as shown in dotted lines. The bolts 14 are then unscrewed and the straps 13 allowed to swing free. The member 11 is folded up to vertical position on the hinge 10, the side walls 12 being offset inwardly of the side walls 7. Obviously, proper manipulation of the hinged supports will be performed during this operation.

All of the above modifications come within the scope of my invention, as well as other or minor modifications of an equivalent nature.

Having described my invention, what I claim as new, and desire to secure by Letters Patent, is:

1. In combination, a trunk body composed of bottom, front and side walls, a carrier section longitudinally movable upon said bottom, means for securing them together in any horizontally adjusted position of the section, and a rear wall for said body hinged to the rear part of said section, said section and rear wall each having side walls, the side walls of the rear wall being offset from the side walls of the body to swingingly pass the side walls of the body when the rear wall is closed on the body.

2. In combination, a trunk body composed of bottom, front and side walls, a carrier section having hinged side walls and longitudinally movable upon said bottom, means for securing said section upon said bottom in any relatively adjusted position of longitudinal extension therefrom, and a rear wall for said body hinged to the rear part of said section.

3. In combination, a trunk body composed of bottom, front and side walls, a carrier section having side walls hingedly connected to said carrier section, said carrier section being longitudinally movable upon said bottom, means for securing said section upon said bottom in any relatively adjusted position of longitudinal extension therefrom, a rear wall hinged to said section, having side walls, and an end-gate hinged to the rear end of said rear wall.

4. In combination, a trunk body composed of bottom, front and side walls, a carrier body composed of a plurality of hingedly connected sections, the forward one of which may be completely retracted upon said bottom, means for supporting said carrier body upon said trunk body in longitudinally adjusted positions thereon, a rear wall for said trunk body hinged to the rear one of said carrier body sections, and pivotally connected links having their free ends pivoted to the body and rear wall for adjustably supporting said rear wall in any tilted or longitudinally adjusted positions thereof between vertical position and rearwardly extending horizontal position.

5. In combination, a trunk body composed of bottom, front and side walls, a carrier section longitudinally adjustably mounted upon said bottom for extension therefrom, a rear wall for said trunk body hinged to the carrier section, and transverse compartment producing elements hingedly mounted upon said rear wall.

6. In combination, a trunk body composed of bottom, front and side walls, a carrier section longitudinally adjustably mounted upon said bottom for extension therefrom, a rear wall with side walls hinged to the rear of said section, and partitioning devices mounted on said rear wall between its side walls and removably adjustably secured thereto to provide compartments thereon.

7. In combination, a trunk body composed of bottom, front and side walls, a carrier section secured adjustably upon said bottom, a rear wall mounted hingedly upon the section, and having side walls, an end-gate hinged on said rear walls, and partitioning devices removably adjustably collapsibly mounted on said rear wall.

8. In a luggage carrier having a relatively fixed basal structure, an extension member slidable thereon, a second member hingedly connected to the outer termination of the extension member, a third member hingedly connected to the outer termination of the second member, means for securing the extension member in adjusted position, other means releasably connecting the second and third members to hold them in alignment, and other means for relatively holding said second and third members as a unit in various tilted positions suitable for supporting articles of varying sizes and shapes.

9. In a luggage carrier having a relatively fixed basal structure, an extension member slidably connected thereto, a second member hingedly connected to the outer termination of the first member, a third member hingedly connected to the outer termination of the second member, compartment forming elements mounted upon one of said members, and means for securing said second and third members in substantially horizontal positions relative to each other and to said basal structure.

10. A luggage carrier including a fixed section having a horizontal portion, a movable section, means slidably connecting said sections whereby the movable section is adapted to move bodily in a horizontal path forwardly and rearwardly on the fixed section while maintaining substantial parallel relation therewith, a third section pivoted to the rear edge of said movable section adapted to swing into selected angular position relative to the movable and fixed section, said third section comprising a plurality of flat members transversely hinged one to another, and means connecting the third and fixed sections to secure the third section in adjusted angular relation to the movable and fixed sections.

11. A luggage carrier including a fixed section having a horizontal portion, a movable section, means slidably connecting said sections whereby the movable section is adapted to move bodily in a horizontal path forwardly and rearwardly on the fixed section while maintaining substantial parallel relation therewith, a third section pivoted to the rear edge of said movable section adapted to swing into selected angular positions relative to the movable and fixed sections, means connecting the third and fixed sections to secure the third section in adjusted angular relation to the movable and fixed sections, partition members carried by the third section, and means for securing the partition members to the third section in selected positions thereon.

12. A luggage carrier including a fixed section having a horizontal portion, a movable section, means slidably connecting said sections whereby the movable section is adapted to move bodily in a horizontal path forwardly and rearwardly on the fixed section while maintaining substantial parallel relation therewith, a third section pivoted to the rear edge of said movable section adapted to swing into selected angular position relative to the movable and fixed section, said third section comprising a plurality of flat members transversely hinged one to another and provided with means for securing the members in selected angular relation with each other, means connecting the third and fixed sections to secure the third section in adjusted angular relation to the movable and fixed sections, partition members hingedly carried by the third section, and means for releasably securing the partition members to the third section in erected positions thereon.

13. In combination, a trunk body composed of bottom, front and side walls a carrier section having hinged side walls and longitudinally movable upon said bottom, means for securing said section in any relatively adjusted position of longitudinal extension therefrom, and a rear wall for said body hinged to the rear part of said section.

14. In combination, a trunk body composed of bottom, front and side walls, a carrier section having side walls hingedly connected to said carrier section, said carrier section being longitudinally movable upon said bottom, means for securing said section in any relatively adjusted position of longitudinal extension, a rear wall hinged to said section, having side walls, and an end-gate hinged to the rear end of said rear wall.

15. In combination, a luggage support for vehicles including a fixed housing having a bottom plate and open at its rear side, a second plate adapted to rest on said bottom plate, means to secure the second plate removably to said bottom plate, a third plate having hinge connection with the second plate whereby said second plate may be folded to permit the third plate to rest on said bottom plate, said means being adapted to secure the third plate removably on said bottom plate when the second plate is folded with respect to said third plate, a fourth plate hinged to the rear edge of the third plate, a fifth plate hinged to the rear edge of the fourth plate, adjustable means connecting the rear part of the fourth plate with the upper part of said housing and supporting the fourth plate in desired angular relation to the third plate, and means to hold said fourth and third plates in adjustably fixed relation.

16. In combination, a luggage support for vehicles including a fixed housing having a bottom plate and open at its rear side, a second plate adapted to rest on said bottom plate, means to secure the second plate removably to said bottom plate, a third plate having hinge connection with the second plate whereby said second plate may be folded to permit the third plate to rest on said bottom plate, said means being adapted to secure the third plate removably on said bottom plate when the second plate is folded with respect to said third plate, a fourth plate hinged to the rear edge of the third plate, adjustable means connecting the rear part of the fourth plate with the upper part of said housing and supporting the fourth plate in desired angular relation to the third plate, means to hold said fourth and third plates in adjustably fixed relation, and a normally upstanding wall at the rear end of said fourth plate.

GEORGE COLVIN KENNEDY.